United States Patent
Hoehn et al.

[15] 3,697,527
[45] Oct. 10, 1972

[54] DOETHYL PHENYL SULFONYLUREAS

[72] Inventors: Hans Hoehn, Tegernheim; Ernst Schulze, Regensburg, both of Germany

[73] Assignee: E. R. Squibb & Sons, Inc., Princeton, N.J.

[22] Filed: Dec. 2, 1970

[21] Appl. No.: 94,522

[52] U.S. Cl. ....... 260/294.8 C, 260/295.5 B, 424/266
[51] Int. Cl. ............................................ C07d 31/44
[58] Field of Search ........................... 260/294.8 F

[56] References Cited

UNITED STATES PATENTS 3,445,470  5/1969  Jucker et al. ............. 260/292

*Primary Examiner*—Alan L. Rotman
*Attorney*—Lawrence S. Levinson, Merle J. Smith, Donald J. Perrella and Burton Rodney

[57] ABSTRACT

New [pyrazolo[3,4-b]pyridin-5-ylformamidoethyl]-phenylsulfonylureas are useful as hypoglycemic agents.

9 Claims, No Drawings

DOETHYL PHENYL SULFONYLUREAS

SUMMARY OF THE INVENTION

The present invention relates to new [pyrazolo[3,4-b]-pyridin-5-foramidoethyl]phenylsulfonylureas and their salts. These new compounds have the formula (I)
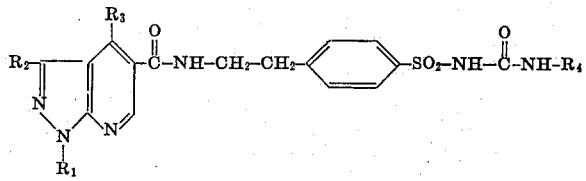

The symbols have the following meanings in formula I and throughout this specification.

$R_1$ represents lower alkyl, phenyl, phenyl-lower alkyl and simply substituted phenyl and phenyl-lower alkyl; $R_2$ represents hydrogen and lower alkyl; $R_3$ represents hydrogen, halogen, lower alkoxy and lower alkenyloxy; $R_4$ represents lower alkyl and cyclo-lower alkyl.

Within each of the groups represented by the symbols, the following are preferred; $R_1$ is lower alkyl, especially ethyl; $R_2$ is methyl; $R_3$ is lower alkoxy, especially ethoxy, straight and branched propoxy, butoxy and pentoxy; and $R_4$ is cyclohexyl.

DETAILED DESCRIPTION OF THE INVENTION

The lower alkyl groups represented by the symbols include straight and branched chain aliphatic hydrocarbon groups of up to seven carbon atoms such as methyl, ethyl, propyl, isopropyl, butyl, t-butyl and the like. The phenyl-lower alkyl groups represented by $R_1$ are radicals in which a phenyl group is attached to a hydrocarbon chain like those above, for example, benzyl, phenethyl and the like.

The phenyl and phenyl-lower alkyl groups may be simply substituted with one or two substituents on the aromatic ring. Thus they may be represented as $(R_5)_n$-phenyl or $(R_5)_n$-phenyl-lower alkyl, wherein $R_5$ is hydrogen, lower alkyl, halogen, or lower alkoxy and $n$ is 1 or 2. The lower alkyl groups are the same as already described. The lower alkoxy groups represented by both $R_3$ and $R_5$ are of the same kind, e.g., methoxy, ethoxy, propoxy, isopropoxy and the like. The lower alkenyloxy groups represented by $R_3$ are ether groups of the same kind having a monounsaturated hydrocarbon chain. All four halogens are contemplated, but chlorine and bromine are preferred in all cases.

The cyclo-lower alkyl groups represented by $R_4$ are the 3- to 6- membered cycloaliphatic groups cyclopropyl, cyclobutyl, cyclopentyl and cyclohexyl.

The new compounds are formed by the following series of reactions.

A 5-aminopyrazole of the formula (II)
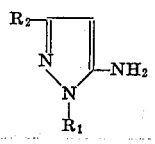

is produced as described in British Pat. No. 1,057,740, published Feb. 8, 1967, by ring closure of an aldehyde or ketone hydrazone of the formula (III)
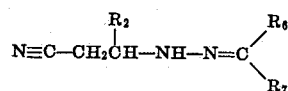

wherein $R_2$ is the same as previously defined and $R_6$ and $R_7$ each is hydrogen, lower alkyl, phenyl or phenyl-lower alkyl. The cyclization is effected by heating at a temperature of about 90° to 130° C. in an inert liquid solvent, e.g., an alcohol like ethanol, butanol or the like, preferably in the presence of a catalyst, e.g., alcoholates like alkali metal alcoholates, particularly butylates such as sodium butylate.

This 5aminopyrazole is reacted with an alkoxymethylene malonic acid ester of the formula (IV)
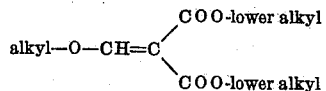

This may be effected by heating the reactants at a temperature of the order of 120° C. for several hours, and results in a compound of the formula (V)
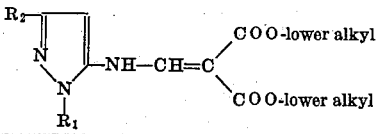

The alkoxymethylene malonic acid esters of formula IV are known compounds and are produced like ethoxymethylene malonic acid diethyl ester [Organic Syntheses 28, 60–62 (1948)].

Cyclization of a compound of formula V, either in an inert solvent such as diphenyl ether at a temperature of about 230–260° C. or by refluxing with a phosphorus halide like phosphorous oxychloride, provides compounds of formula (VI)
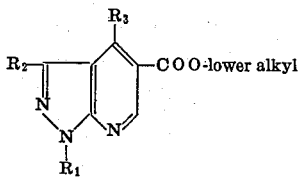

in which $R_3$ is hydroxy in the first case and halogen in the second case, depending on the method of cyclization. Treatment of a compound of formula VI, in which $R_3$ is a hydroxy group, with an alkylating agent such as a lower alkyl halide like ethyl iodide in an inert organic solvent and in the presence of an alkali metal carbonate provides the 4-lower alkoxy compound.

Alternatively, instead of alkylating the 4-hydroxy compound of formula VI, the 4-halogenated product may also be converted to the 4-alkoxy-1H-pyrazolo[3,4-b]pyridine-5-carboxylic acid ethyl ester by means of a metal alcoholate. The free acids corresponding to the esters of formula VI may be obtained from the ester by treatment with aqueous sodium hydroxide solution.

Conversion of the free acid, in which $R_3$ represents hydrogen, lower alkoxy or chlorine, by means of thionyl chloride produces a compound of the formula (VII)
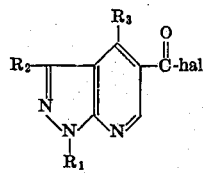

in which hal represents halogen. This acid-chloride is reacted with p-(β-aminoethyl)benzenesulfonamide benzenesulfonamide of the formula (VIII) 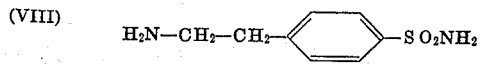

and results in a compound of formula (IX) 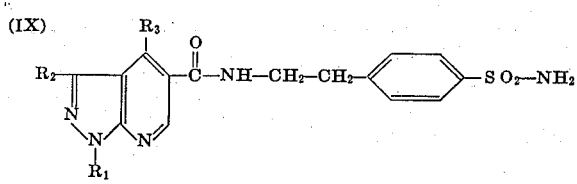

Alternatively, a compound of formula IX may be prepared by reacting the free acid referred to above with a compound of formula VIII in the presence of isobutyl-chloroformate of the formula (X) 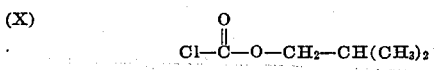

The sulfonyl ureas of this invention are then prepared by reacting the benzenesulfonamide of formula IX or a salt thereof, e.g., an alkali metal salt, with an $R_4$-substituted isocyanate (e.g., $R_4$—N=C=O which is preferred) or $R_4$-substituted carbamic acid esters, thiocarbamic acid esters, carbamic acid halides or ureas.

The compounds of formula I form basic salts, e.g., with metals such as alkali metals like sodium and potassium, alkaline earth metals like calcium magnesium, barium and the like. The salts are formed by conventional methods, e.g., by treatment with a metal alcoholate in an alcohol, e.g., sodium ethylate in ethanol solution. The formation of a salt is frequently useful in purifying the product. Neutralization of the salt gives the free sulfonylurea again.

The sulfonylureas obtained from this invention are useful as hypoglycemic agents and are characterized by a strong and long-lasting blood-glucose lowering action in various mammalian species. The hypoglycemic activity of these compounds may be evaluated, e.g., in rats, mice, rabbits, dogs and the like, by utilizing W.S. Hoffmann's potassium ferricyanide-potassium ferrocyanide oxidation-reduction reaction in an Autoanalyzed [J. Biol. Chem. *120, 51* (1937)], or the enzymatic method described by A. Keston (abstract of Papers, 129th Meeting Amer. Chem. Soc., p.31c) and F. H. Schmidt [Internist *4*, 554, (1963)].

For this purpose, a compound or mixture of compounds of formula I, or non-toxic, physiologically acceptable salt thereof, may be administered orally or parenterally in a conventional dosage form as tablet, capsule, injectable or the like. A single dose, or preferably 2 to 4 divided daily doses, provided on a basis of about 1 to 50 mg. per kilogram per day, preferably about 2 to 15 mg. per. kilogram per day, is appropriate. These may be conventionally formulated in an oral or parenteral dosage form by compounding about 10 to 250 mg. per unit of dosage with conventional vehicle, excipient binder, preservative, stabilizer, flavor or the like as called for by accepted pharmaceutical practice.

The following examples are illustrative of the invention. Other members of the group may readily be produced in similar fashion by replacing the starting materials with appropriately substituted 5-aminopyrazoles or isocyanates. All temperatures are on the centigrade scale.

EXAMPLE 1

1-Cyclohexyl-3-[[p-[2-[(4-ethoxy-1-ethyl-1H-pyrazolo[3,4-b]-pyridin-5-yl)formamido]ethyl]phenyl] sulfonyl]urea a. [[(1-ethyl-5-pyrazolyl)amino]methylene]malonic acid diethyl ester 245 g. of 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (b.p. $_{0.1}$ 154°–160°) yields 520 g. (84 percent of theory) of a quickly crystallizing oil of [[(1-ethyl-5-pyrazolyl)amino]methylene]malonic acid diethyl ester, m.p. 50°–53°. The compound is recrystallized from N-hexane, m.p. 55°–57°.

b. 1(-ethyl-4-hydroxy-1-H-pyrazolo[3,4-b]pyridine-5-carboxylic acid ethyl ester 253 g. of [[(1-ethyl-5-pyrazolyl)amino]methylene] malonic acid diethyl ester (0.09 mol.) are dissolved in 770 g. of diphenyl ether. The reaction mixture is heated to 235°–250° (bath temperature) and allowed to react at this temperature for 1 to 2 hours, while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b]pyridine-5-carboxylic acid ethyl ester is obtained at b.p.$_{0.05}$ 115°–120°, yield 195 g. = 92 percent of theory, m.p. 85°–87°. The compound is recrystallized from benzine 90° to 100°), m.p. 87°–89°.

c. 4-ethoxy-1H-pyrazolo[3,4-b]pyridine-5-carboxylic acid ethyl ester 400 g. of well pulverized potassium carbonate and 300 g. of ethyl iodide are introduced into a solution of 259 g. (1.1 mol.) 1-ethyl-4-hydroxy-1H-pyrazolo[3,4-b]pyridine-5carboxylic acid ethyl ester in 1.7 of dimethylformamide. The reaction mixture is stirred for 7 hours at 65° and filtered off under suction, while hot, from the excess potassium carbonate. Upon standing overnight, 165 g. of ethyl ester crystallizes from the solution, m.p. 112°–115°. After evaporation of the mother liquor, and additional 80 g. are obtained. The total yield amounts to 85 percent of the theory. The 4-ethoxy-1-ethyl-1H-pyrazolo[3,4-b]pyridine-5-carboxylic acid ethyl ester is recrystallized from benzine, (90°–100°), m.p. 113°–115°.

d. 4-ethoxy-1H-pyrazolo[3,4-pyridine-5-carboxylic acid 26.3 g. of 4-ethoxy-1-ethyl-1-H-pyrazolo[3,4-b]-pyridine-5-carboxylic acid ethyl ester (0.1 mol.) is hydrolyzed with 375 ml. of aqueous sodium hydroxide (1.5 N.) room temperature with stirring for 10 hours. After acidification with hydrogen chloride, 21.8 g. of 4-ethoxy-1-ethyl-1H-pyrazolo[3,4-b]pyridine-5-carboxylic acid, m.p. 198°–199°, (yield 92.5 percent) are obtained.

e. 4-ethoxy-1-ethyl-1H-pyrazolo[3,4-b]pyridine-5-carbonyl chloride 26.5 g. of 4-ethoxy-1-ethyl-1H-pyrazolo[3,4-b]pyridine-5-carboxylic acid (0.11 mol.) and 150 ml. of thionyl chloride are refluxed for 7 hours. The thionyl chloride is removed by means of a water aspirator. The residue, weighing 27 g. (96 percent of theory), contains the crude 4-ethoxy-1-ethyl-1H-pyrazolo[3,4-b]pyridine-5carbonyl chloride, m.p. 116°–120°, which can be used without further purification for the next reaction step. A sample recrystallized from cyclohexane melts at 122°–124°.

f. 4-[β-(4-ethoxy-1-ethyl-1H-pyrazolo[3,4-b]pyridine-5-formamido)ethyl]benzenesulfonamide 29.4 g. of p-(β-aminoethyl)benzenesulfonamide (0.14 mol.) are added to 17.5 g. 4-ethoxy-1-ethyl-1H-pyrazolo[3,4-b]pyridine-5-carbonyl chloride (0.07 mol.) suspended in 200 ml. of anhydrous pyridine. The reaction mixture is stirred for two hours at room temperature. The precipitate consisting of 4-[β-(4-ethoxy-1-ethyl-1H-pyrazolo[3,4-b]pyridine-5-formamido)ethyl]-benzenesulfonamide and p-(β-aminoethyl)benzenesulfonamide hydrochloride, is filtered off under suction and washed with pyridine and ether. In order to remove the hydrochloride of the starting sulfonamide, the precipitate is washed off with water and then dried, yield 10 g., m.p. 220°–222°. By evaporating the mother liquor and treating the residue with water, an additional 10 g. are obtained. The total yield of 4-[β-(4-ethoxy-1-ethyl-1H-pyrazolo[3,4-b]pyridine-5-formamido)ethyl]benzenesulfonamide amounts to 20 g. = 69 percent of theory. The compound is recrystallized from dioxane, m.p. 221°–222°.

g. 1-Cyclohexyl-3-[[p-[2-[(4-ethoxy-1-ethyl-1H-pyrazolo-]3,4-b]pyridin-5-yl)formamido]ethyl]phenyl]sulfonyl]urea 4.2 g. of 4-[β-(4-ethoxy-1-ethyl-1H-pyrazolo[3,4-b]-pyridine-5-formamido)ethyl]benzenesulfonamide (0.01 mol.) and 2.8 g. of well pulverized potassium carbonate (0.02 mol.) are suspended in 75 ml. of acetone. The mixture is refluxed for one hour, then 1.3 g. of cyclohexylisocyanate (0.01 mol.) are added rapidly, one drop at a time. The whole is refluxed for 4 hours with stirring. After cooling, the precipitate is filtered off under suction, washed with acetone and in turn dissolved in 150 ml. of hot water. Undissolved matter is separated by filtration, and the filtrate is acidified with dilute hydrochloric acid. The 1-cyclohexyl-3-[[p-[2-[(4-ethoxy-1-ethyl)-1H-pyrazolo[3,4-b]pyridin-5-yl)formamido]-ethyl]-phenyl]sulfonyl]urea which precipitates in the form of crystals melts after recrystallization from a mixture of methanol and dioxane at 213°–214°. Yield 3.7 g. = 68 percent of theory.

For the preparation of the sodium salt, the 1-cyclohexyl-3-[[p-[2-[(4-ethoxy-1-ethyl)-1H-pyrazolo]3,4-b]pyridin-5-yl)formamido]-ethyl]phenyl]sulfonyl]urea is treated with an equimolar amount of sodium ethylate in an ethanol solution. At room temperature, the sodium salt precipitates in the form of white crystals melting at 199°–201°.

EXAMPLE 2

1-Cyclohexyl-3-[[p-[2-[(4-ethoxy-1-ethyl-1H-pyrazolo[3,4-b]-pyridin-5-yl)formamido]ethyl]phenyl]sulfonyl]urea a. 4-chloro-1-ethyl-1H-pyrazolo[3,4-b]pyridine-5-carboxylic acid ethyl ester A mixture of 12 g. of [[1-ethyl-5-pyrazolyl)amino]methylene]-malonic acid diethyl ester (0.043 mol.) and 70 ml. of phosphorus oxychloride is refluxed for 10 hours. The excess phosphorus oxychloride is removed in vacuo and the oily residue is treated with 50 ml. of water which causes the oil to become crystalline. The solid material is filtered off under suction and dried in a desiccator; yield 8.5 g. = 79 percent of theory. The 4-chloro-1-ethyl-1H-pyrazolo[3,4-b]pyridine-5-carboxylic acid ethyl ester is recrystallized from N-hexane, m.p. 62°.

Alternatively, the 4-chloro-1-ethyl-1H-pyrazolo[3,4-b]-pyrimidine-5-carboxylic acid ethyl ester is prepared as follows: A mixture of 23.5 g. of 1-ethyl-4-hydroxy-1H-pyrazolo[3,4-b]-pyridine-5-carboxylic acid ethyl ester (0.1 mol.) and 150 ml. of phosphorus oxychloride is refluxed for 4 hours. The excess phosphorus oxychloride is removed by means of vacuum distillation. As soon as the phosphorus oxychloride is removed, the oily residue solidifies on cooling. It is treated with water and filtered off under suction (24.5 g.), m.p. 55°–60°. The 4-chloro-1-ethyl-1H-pyrazolo[3,4-b]pyridine-5-carboxylic acid ethyl ester is recrystallized from N-hexane (22.5 g. = 87 percent), m.p. 62°.

b. 4-ethoxy-1-ethyl-1H-pyrazolo[3,4-b]pyridine-5-carboxylic acid and ethyl ester 25.4 g. of 4-chloro-1-ethyl-1H-pyrazolo[3,4-b]pyridine-5-carboxylic acid ethyl ester (0.1 mol.) are added to a solution of 2.3 g. of sodium (0.1 mol.) in 250 ml. of ethanol. This mixture is kept at room temperature for 12 hours. After this, the separated sodium chloride is filtered off under suction and the filtrate is evaporated to dryness in vacuo. The residue, 4-ethoxy-1-ethyl-1H-pyrazolo[3,4-b]pyridine-5-carboxylic acid ethyl ester, is recrystallized from benzine (90°–100°), m.p. 113°–°, yield 24.8 g. = 94.5 percent of theory. Hydrolysis of this product, according to the procedure of example 1(d), provides 4-ethoxy-1-ethyl-1H-pyrazolo[3,4-b]pyridine-5-carboxylic acid.

c. 1-Cyclohexyl-3-[[p-[2-[(4-ethoxy-1-ethyl-1H-pyrazolo-[3,4-b]pyridin-5-yl)formamido]ethyl]phenyl]sulfonyl]

A solution of 23.5 g. of 4-ethoxy-1-ethyl-1H-pyrazolo-[3,4-b]pyridine-5-carboxylic acid (0.1 mol.) in 300 ml. of chloroform and 20 m. of triethylamine is cooled to 0°. At this temperature, 19 g. of isobutylchloroformate is added one drop at a time. The whole is stirred for two hours during which time the temperature may increase to 15°. A suspension consisting of 20 g. of p-(β-aminoethyl)benzenesulfonamide (0.1 mol.) in 200 ml. of chloroform and 20 ml. of triethylamine is added to the mixture. The mixture is stirred at room temperature for four hours, the precipitate is filtered off under suction and washed with chloroform. With the amount isolated from the mother liquor, 26.5 g. of 4-[β-(4-ethoxy-1-ethyl-1H-pyrazolo-[3,4-b]pyridin-5-formamido)ethyl]benzenesulfonamide, m.p. 213°–214° is obtained which in turn is converted to 1-cyclohexyl-3-[[p-[2-[1-ethyl-1H-pyrazolo[3,4-b]pyridin-5-yl)formamido]ethyl]phenyl]sulfonyl]urea according to the procedure of Example 1 (g).

EXAMPLE 3

1-Cyclohexyl-3-[[p-[2-(4-chloro-1-ethyl-3-methyl-1H-pyrazolo-[3,4-b]pyridin-5-yl)formamido]ethyl]phenyl]sulfonyl]urea a. [[(1-ethyl-3-methyl-5-pyrazolyl)amino]methylene]malonic acid diethyl ester 12.5 g. of 1-ethyl-3-methyl-5-aminopyrazole (0.1 mol.) and 21.6 g. of ethoxymethylene malonic acid diethyl ester (0.1 mol.) are heated to 120° (bath temperature) for 2 hours with stirring. The ethanol formed by this reaction is removed by means of a water aspirator. Then vacuum distillation (b.p.$_{0.05}$ 152°–153°) yields 24.0 g. (81.5 percent of theory) of a quickly crystallizing oil, [[(1-ethyl-3-methyl-5-pyrazolyl)amino]methylene]malonic acid diethyl ester, m.p. 60–°67°. The product, recrystallized from benzine (90°–100°), melts at 69°–70°.

b. 1-ethyl-4-hydroxy-3-methyl-1H-pyrazolo[3,4-b]pyridine-5-carboxylic acid and ethyl ester 14.8 g. of [[(1-ethyl-3-methyl-5-pyrazolyl)amino]methylene]malonic acid diethyl ester (0.05 mol.) are dissolved in 50 g. of diphenyl ether. The reaction mixture is heated to 235°–250° (bath temperature) and allowed to react at this temperature for 1 to 2 hours, while the resulting ethanol is continuously distilled off. The last part of the alcohol is removed by means of water aspirator. The diphenyl ether is separated by distillation with a fractionating column in vacuo. The 1-ethyl-4-hydroxy-3-methyl-1H-pyrazolo[3,4-b]pyridine-5-carboxylic acid ethyl ester is obtained at b.p.$_{0.1 - 0.5}$ 125°–129°, yield 10.7 g. = 86 percent of theory, m.p. 91°–93°. The compound is recrystallized from benzine (90°–100°), m.p. 93°–94°. Hydrolysis of this product with aqueous sodium hydroxide yields 1-ethyl-4-hydroxy-3-methyl-1H-pyrazolo[3,4-b]pyridine-5-carboxylic acid, m.p. 212°–213°.

c. 4-chloro-1-ethyl-3-methyl-1H-pyrazolo[3,4-b]pyridine-5-carbonyl chloride 22 g. of 1-ethyl-4-hydroxy-3-methyl-1H-pyrazolo[3,4-b]-pyridine-5-carboxylic acid (0.1 mol.) and 75 ml. of thionyl chloride are refluxed for 4 hours. The clear thionyl chloride solution is evaporated to dryness in vacuo. The residue, weighing 24 g. (93 percent of theory), contains the crude 4-chloro- 1-ethyl-3methyl-1H-pyrazolo[3,4-b]pyridine-5-carbonyl chloride, which can be used without further purification for the next reaction step. A sample recrystallized from cyclohexane melts at 68°–70°.

d. 4-[β-(4-chloro-1-ethyl-3-methyl-1H-pyrazolo[3,4-b]pyridine-5-formamido)ethyl]benzenesulfonamide 13 g. of p-(β-aminoethyl)benzenesulfonamide (0.077 mol.) are added to a solution of 9 g. of 4-chloro-1-ethyl-3-methyl-1H-pyrazolo[3,4-b]pyridine-5-carbonyl chloride (0.053 mol.) in 100 ml. of anhydrous pyridine. After stirring the reaction mixture for 3 hours at room temperature, the precipitated p-(β-aminoethyl) benzenesulfonamide hydrochloride is filtered off under suction and the filtrate is evaporated to dryness in vacuo. The residual product, 4[β-(4-chloro-1-ethyl-3-methyl-1H-pyrazolo-[3,4-b]pyridine-5-formamido)ethyl]benzenesulfonamide is treated with water, filtered under suction and recrystallized from a mixture of ethanol and dioxane, yield 10 g. = 68 percent of theory; m.p. 258°–260°.

e. 1-Cyclohexyl-3-[[p-[2-(4-chloro-1-ethyl-3-methyl-1H-pyrazolo-[3,4-b]pyridin-5-yl)formamido]ethyl]phenyl]sulfonyl]urea 1-Cyclohexyl-3-[[p-[2-(4-chloro-1-ethyl-3-methyl-1H-pyrazolo[3,4-b]pyridin-5-yl)formamido]ethyl]phenyl]-urea is obtained by substituting an equivalent amount of 4-[β-(4-chloro-1-ethyl-3-methyl-1H-pyrazolo[3,4-b]pyridine-5-formamido)ethyl]benzenesulfonamide for the 4-[β-(4-ethoxy-1-ethyl-1H-pyrazolo[3,4-b]pyridine-5-formamido)ethyl]benzene-sulfonamide in the procedure of Example 1 (g). Yield = 73 percent of theory, m.p. 217°–218°.

EXAMPLE 4

1-Cyclohexyl-3-[[p-[2-(4-ethoxy-1-ethyl-3-methyl-1H-pyrazolo-[3,4-b]pyridine-5-yl)formamido]ethyl]phenyl]sulfonyl]urea 5.5 g. of 1-cyclohexyl-3-[[p-[2-(4-chloro-1-ethyl-3-methyl-1H-pyrazolo[3,4-b]pyridin-5-yl)formamido]ethyl]phenyl]-sulfonyl]urea (0.01 mol.) are added to a solution of 0.5 g. of sodium (0.022 mol.) in 75 ml. of ethanol. This mixture is kept at room temperature for 4 hours. After this time, the precipitate is filtered off under suction, washed with absolute ethanol and anhydrous ether, and dissolved in 50 ml. of water. The undissolved matter is separated by filtration and the filtrate is acidified with dilute hydrochloric acid. The 1-cyclohexyl-3-[[p-[2-(4-ethoxy-1-ethyl-3-methyl-1H-pyrazolo-[3,4-b[pyridin-5-yl)formamido]ethyl]phenyl]sulfonyl]urea, which precipitates in the form of crystals, melts after drying in the desiccator and recrystallization from absolute ethanol at 185°–186°. The same compound containing one mole of water has a melting point of 162°–164°. Yield 4.7 g. = 84.5 percent of theory. The sodium salt of 1-cyclohexyl-3-[[p-[2-(4-ethoxy-1-ethyl-3-methyl-1H-pyrazolo[3,4-b]pyridin-5-yl)formamido]ethyl]phenyl]-sulfonyl]urea is prepared according to the procedure of Example 1 (g).

EXAMPLE 5

1-Cyclohexyl-3-[[p-[2-(1-ethyl-3-methyl-1H-pyrazolo[3,4-b]pyridine-5-yl)formamido]ethyl]phenyl]sulfonyl]urea 4-[β-(1-ethyl-3-methyl-1H-pyrazolo[3,4-b]pyridine-5-formamido)ethyl]benezenesulfonamide, m.p. 217°–220°, is obtained by substituting an equivalent amount of 1-ethyl-3-methyl-1H-pyrazolo[3,4-b]pyridine-5-carboxylic acid for the 4-ethoxy-1-ethyl-1H-pyrazolo[3,4-b]pyridine-5-carboxylic acid in the procedure of Example 2 (c). This may in turn be converted to 1-cyclohexyl-3-[[p-[2-(1-ethyl-3-methyl-1H-pyrazolo[3,4-b]-pyridine-5-yl)formamido]ethyl]phenyl]sulfonyl]urea according to the procedure in Example 1 (g), m.p. 192°–194° (methanol). The sodium salt of this product which is prepared according to the procedure of Example 1 (g), contains 1/2 mole of water, m.p. ≈ 295°.

The following additional compounds are produced by the procedure of Example 1:

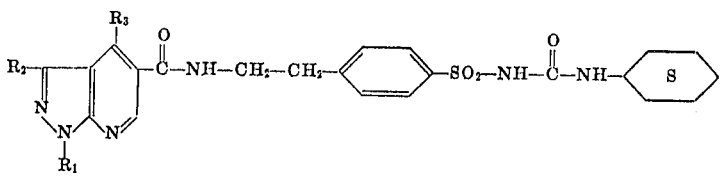

| Example | R₁ | R₂ | R₃ | M.P. (deg.) | M.P. sodium salt (deg.) decomp. |
|---|---|---|---|---|---|
| 6 | CH₃—CH₂ | H | CH₃—O | | 245 |
| 7 | CH₃—CH₂ | CH₃ | CH₃—O | 193–194 | 210 |
| 8 | CH₃—CH₂ | CH₃ | (CH₃)₂CH—O | 193–194 | 216–18 |
| 9 | CH₃—CH₂—CH₂—CH₂ | CH₃ | Cl | 212 | |
| 10 | CH₃—CH₂—CH₂—CH₂ | CH₃ | CH₃—CH₂—O | 187–188 | |
| 11 | CH₃—CH₂ | CH₃ | CH₃—CH₂—HC₂—CH₂—O | 184–185 | |
| 12 | (CH₃)₂CH | CH₃ | CH₃—CH₂—O | 178–180 | 252–54 |
| 13 | CH₃—CH₂ | CH₃ | (CH₃)₂CH—HC₂—O | 152–153 | 224–25 |
| 14 | CH₃—CH₂—CH₂—CH₂ | CH₃ | CH₃—O | | 195–197 |
| 15 | CH₃—CH₂—CH₂ | CH₃ | CH₃—CH₂—O | 165–167 | 211–213 |
| 16 | (CH₃)₂CH | CH₃ | CH₃—O | 172–174 | 249–251 |
| 17 | CH₃—CH₂ | CH₃ | (CH₃)₂CH—HC₂—CH₂—O | 170–172 | |
| 18 | CH₃—CH₂ | CH₃ | CH₂=CH—CH₂—O | 165–167 | |

EXAMPLE 19

1-Cyclopentyl-3-[[p-[2-[(4-ethoxy-1-ethyl-1H-pyrazolo[3,4-b]-pyridin-5-yl)formamido]ethyl]phenyl]sulfonyl]urea By substituting 0.01 mole of cyclopentylisocyanate for the cyclohexylisocyanate in the procedure of Example 1 (g), 1-cyclopentyl-3-[[p-[2-[(4-ethoxy-1-ethyl-1H-pyrazolo[3,4-b]-pyridin-5-yl)formamido]ethyl]phenyl]sulfonyl]urea is obtained.

The following additional compounds are produced by the procedure of Example 1 by replacing the 1-ethyl-5-amino-pyrazole in part a with the appropriately substituted 5-aminopyrazole and replacing the cyclohexylisocyanate with cyclopentyl isocyanate in part g. The halogenated compounds are made as in Example 3.

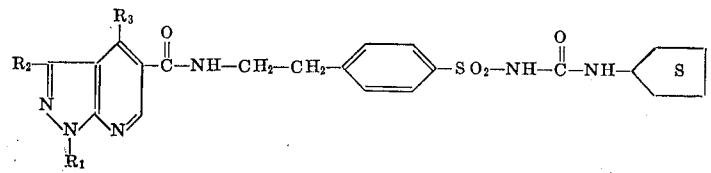

| Example | R₁ | R₂ | R₃ |
|---|---|---|---|
| 20 | C₂H₅ | H | CH₃O |
| 21 | —⟨phenyl⟩ | H | C₂H₅O |
| 22 | —⟨phenyl⟩ | CH₃ | C₂H₅O |
| 23 | —⟨phenyl⟩ | C₂H₅ | Br |
| 24 | Br—⟨phenyl⟩— | C₂H₅ | Br |
| 25 | Cl—⟨phenyl⟩—Cl | H | C₂H₅O |
| 26 | CH₃O—⟨phenyl⟩—CH₃O | C₂H₅ | C₃H₇O |
| 27 | CH₃—⟨phenyl⟩— | H | Cl |
| 28 | Cl—⟨phenyl⟩—CH₂ | H | Cl |
| 29 | CH₃—⟨phenyl(CH₃)(CH₃)⟩—CH₂ | CH₃ | C₂H₅O |

| Example | R₁ | R₂ | R₃ |
|---|---|---|---|
| 30 | C₆H₅—CH₂— | H | CH₂=CH—CH₂O |
| 31 | CH₃O—C₆H₄—CH₂— | CH₃ | CH₃O |

The following additional compounds are produced by the procedure of Example 1 (or Example 3 where R₃ = halogen) by replacing the 1-ethyl-5-aminopyrazole in part a with the appropriately substituted 5-aminopyrazole and, where appropriate, replacing the cyclohexylisocyanate with the appropriate R₄-isocyanate:

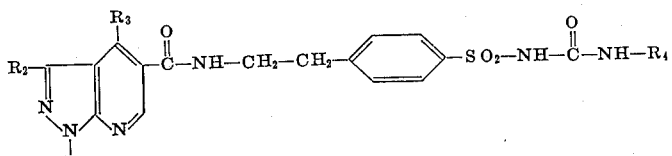

| Example | R₁ | R₂ | R₃ | R₄ |
|---|---|---|---|---|
| 32 | C₆H₅— | H | CH₃O | cyclohexyl |
| 33 | C₆H₅—CH₂— | CH₃ | H | cyclohexyl |
| 34 | Cl—C₆H₄— | C₂H₅ | Cl | cyclohexyl |
| 35 | Cl—C₆H₄— | C₂H₅ | Cl | cyclohexyl |
| 36 | C₂H₅ | H | CH₃O | cyclopentyl |
| 37 | C₆H₅— | H | C₂H₅O | C₂H₅ |
| 38 | C₆H₅— | CH₃ | C₂H₅O | i-C₃H₇ |
| 39 | C₆H₅— | C₂H₅ | Br | C₄H₉ |
| 40 | Br—C₆H₄— | C₂H₅ | Br | C₄H₉ |
| 41 | 2,4-Cl₂—C₆H₃— | H | C₂H₅O | CH₃ |
| 42 | 2,4-(CH₃O)₂—C₆H₃— | C₂H₅ | C₃H₇O | C₄H₉ |
| 43 | 3-CH₃-4-CH₃O—C₆H₃— | C₂H₅ | C₂H₅O | C₂H₅ |
| 44 | Cl—C₆H₄—CH₂— | H | Cl | C₄H₉ |
| 45 | 2,6-(CH₃)₂—C₆H₃—CH₂— | CH₃ | C₂H₅O | C₄H₉ |
| 46 | C₆H₅—CH₂— | H | CH₂=CH—CH₂O | C₃H₇ |
| 47 | C₂H₅ | CH₃ | CH₃CH₂CHCH₂O (C₂H₅) | cyclohexyl |

What is claimed is:

1. A compound of the formula

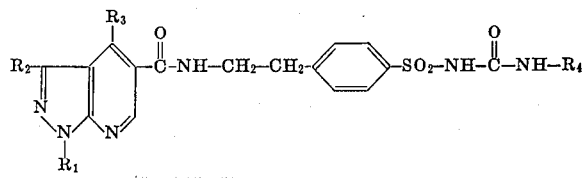

wherein $R_1$ is lower alkyl, $(R_5)_n$-phenyl or $(R_5)_n$-phenyl-lower alkyl, $R_2$ is hydrogen or lower alkyl, $R_3$ is hydrogen, halogen, lower alkoxy or lower alkenyloxy, $R_4$ is lower alkyl or cyclo-lower alkyl, $R_5$ is hydrogen, lower alkyl, halogen or lower alkoxy, and $n$ is 1 or 2, and physiologically acceptable salts thereof.

2. A compound as in claim 1 wherein $R_4$ is cyclohexyl.

3. A compound as in claim 2 wherein $R_1$ and $R_2$ each is lower alkyl and $R_3$ is lower alkoxy.

4. A compound as in claim 2 wherein $R_1$ is lower alkyl, $R_2$ is hydrogen and $R_3$ is lower alkoxy.

5. A compound as in claim 2 wherein $R_1$ and $R_2$ each is lower alkyl and $R_3$ is halogen.

6. A compound as in claim 2 wherein $R_1$ is ethyl, $R_2$ is hydrogen and $R_3$ is ethoxy.

7. A compound as in claim 2 wherein $R_1$ is ethyl, $R_2$ is ethyl and $R_3$ is chlorine.

8. A compound as in claim 2 wherein $R_1$ is ethyl, $R_2$ is methyl and $R_3$ is ethoxy.

9. A compound as in claim 2 wherein $R_1$ is ethyl, $R_2$ is methyl and $R_3$ is hydrogen.

* * * * *